United States Patent [19]

Koenig

[11] Patent Number: 4,796,474
[45] Date of Patent: Jan. 10, 1989

[54] WEB TENSION TRANSDUCER APPARATUS

[75] Inventor: Robert G. Koenig, Hudson, Ohio

[73] Assignee: Cleveland Machine Controls, Inc., Cleveland, Ohio

[21] Appl. No.: 92,395

[22] Filed: Sep. 2, 1987

[51] Int. Cl.$^4$ .............................................. G01L 5/10
[52] U.S. Cl. ............................... 73/862.65; 73/862.48
[58] Field of Search ............ 73/862.48, 862.07, 862.54, 73/862.55, 862.65

[56] References Cited

U.S. PATENT DOCUMENTS

| | | |
|---|---|---|
| Re. 31,312 | 7/1983 | Eddens ............................... 73/862.48 |
| 3,260,106 | 7/1966 | Hull et al. . |
| 3,763,701 | 10/1973 | Wright et al. . |
| 4,052,891 | 10/1977 | Bartlett . |
| 4,326,424 | 4/1982 | Koenig ............................... 73/862.48 |
| 4,735,102 | 4/1988 | Koenig ............................... 73/862.48 |

Primary Examiner—Jerry W. Myracle
Attorney, Agent, or Firm—Body, Vickers & Daniels

[57] ABSTRACT

A moving web tension monitoring apparatus of easily fabricated, relatively inexpensive and easily assembled construction comprises a cantilever mounted strain beam element coupled at the flexurable end thereof through a self-aligning bearing to one end of the support shaft for the web supporting guide roll by a coupling member removably fastened to the shaft end and having a multiply axially split expandable tubular collar portion projecting endwise from the shaft end into the self-aligning bearing and expanded by a locking member forcibly inserted into the collar portion to expand and tightly lock it to the bearing. The self-aligning bearing preferably is of the roller bearing type having barrel shaped roller elements, and the strain beam means preferably is of the twin beam type having a pair of vertically spaced, parallel beam members formed by drilling out the core of a metal block member from which the sensor member of the transducer is fabricated.

21 Claims, 5 Drawing Sheets

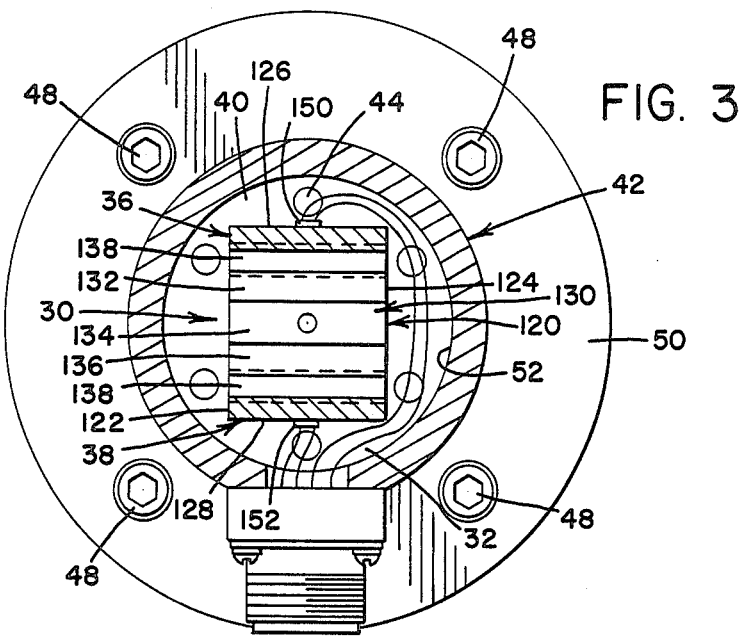
FIG. 3
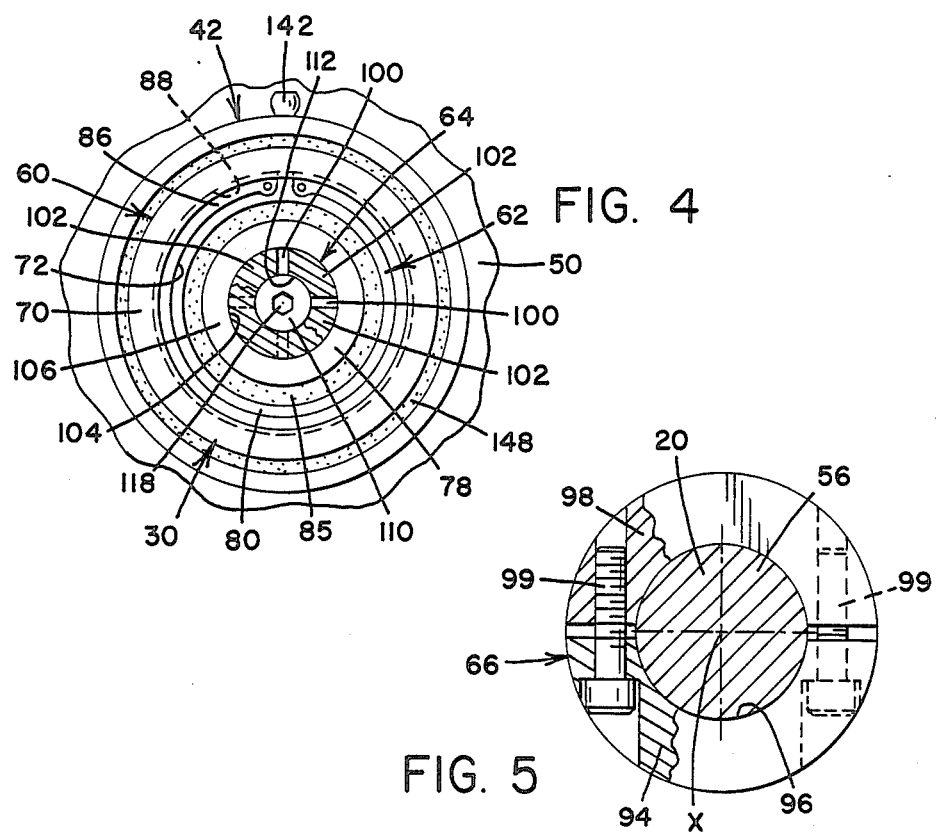
FIG. 4
FIG. 5

WEB TENSION TRANSDUCER APPARATUS

This invention relates in general to monitoring apparatus for measuring and indicating the tension in a continuously moving web, and, more particularly, to apparatus for sensing the tension in rapidly moving webs and producing a signal proportional to such tension.

PRIOR ART

This invention in many ways relates to improvements in the transucer devices described in U.S. Pat. Nos. 3,260,106 Hull et al, issued July 12, 1966; 3,763,701 Wright et al, issued Oct. 9, 1973; 4,052,891 Bartlett, issued Oct. 11, 1977; 4,326,424 Koenig, issued Apr. 27, 1982; and U.S. Pat. No. Re. 31,312 Eddens, reissued July 19, 1983, and the disclosures of such patents are incorporated herein by reference.

BACKGROUND OF THE INVENTION

As disclosed in the above patents, in web handling processes wherein a web of flexible material such as a fabric, paper, or metal, is continuously passed at high speeds partly around a guide roll either fixed or rotatably supported on a shaft, it is known to support one or both ends of the shaft by a transducer device capable of measuring the transverse or radial forces exerted on the roll by the tensions in the moving web and then making continuing adjustments to the web tension, responsive to the ongoing web tension measurements, either by manual or automatic control equipment. These known web tension measuring devices are customarily comprised of a sensor in the form of a strain beam cantilever mounted on a fixed frame and the flexurable free end of which is coupled to and supports an end of the guide roll shaft through either a thin flexurable steel diaphragm or a pivotal connection such as a self-aligning bearing. Strain gauges attached to the strain beam and connected in an electrical circuit then generate a continuing electrical signal representative of the beam deflection by the web tension forces and thus representative of the instantaneous tension in the moving web.

While the use of a flexurable diaphragm to support the end of the guide roll shaft of such web tension measuring devices is advantageous for a number of reasons such as avoiding the introduction of hysteresis into the measurements of the beam deflection and permitting minor amounts of shaft misalignment and length expansion to occur without seriously affecting the accuracy of such measurements, the diaphragm nevertheless is limited in the amount of tolerance which it has for such variables. In addition, the life of the diaphragm is somewhat limited because of the constant flexing thereof during use which leads to fatigue and failure of the diaphragm in a relatively short period of operating time, thus necessitating the disassembly and reassembly of the apparatus from time to time to enable replacement of the damaged diaphragm. To avoid such difficulties, therefore, web tension measuring devices of the general type referred to above the commonly in use at present generally have been provided with sliding or ball type pivoting connections or self-aligning bearings instead of a flexurable diaphragm for coupling the end of the guide roll shaft to and supporting it on the flexurable end of the cantilever mounted strain beam of the device.

Prior known types of web tension measuring or transducer devices employing such sliding or ball type pivotal or self-aligning bearings for connecting the end of the guide roll support shaft to the unsupported free end of the flexurable strain beam have not proven entirely satisfactory for one reason or another, however, for every form of service application. Included among these various reasons for their not beign entirely satisfactory in all cases are their susceptibility to unacceptable high hysteresis, the critical and expensive manufacturing procedures involved in their fabrication, the lack of any provision for self-lubrication of the self-aligning bearings to prolong the service life thereof and minimize hysteresis, the limited ability of the ball bearing type shaft supports to accommodate shaft expansion and their limited load capacity, their involved assembly and disassembly procedures, and the many component parts of which some of these prior known devices are constituted. Also, the bearing surfaces on which the race members of the self-aligning bearings of some such prior transducer devices are journaled or engaged have been subject to undesired fretting corrosion resulting in high hysteresis such as required their early replacement.

SUMMARY OF THE INVENTION

The present invention contemplates a new and improved moving web tension sensor and transducer device which overcomes all of the above referred to problems and others and provides a web tension measuring and monitoring device of comparatively simple and easily fabricated and assembled construction and having relatively low hysteresis within acceptable limits for most service applications and adequate ability to accommodate shaft expansion and/or guide roll misalignment without seriously affecting the accuracy of the web tension measurements.

Briefly stated, in accordance with one aspect of the invention, in a strain beam sensor for the support shaft of the guide roll in a moving web tensioning machine having a cantilever mounted flexurable strain beam means supporting at its flexurable end an opposed end of the shaft by a self-aligning bearing mounted on a coupling member secured to the shaft end, the coupling member is provided with a multiply axially split tubular collar portion which extends axially of and endwise from the shaft end into the inner race of the bearings and is expanded therein, by a pipe plug screw-threaded into the collar portion, to tightly engage and lock the collar portion to the bearing inner race whereby fretting corrosion of the interengaged surfaces thereof and resulting hysteresis in the electrical response curve of the beam strain measurements are minimized.

In accordance with another aspect of the invention, the strain beam means of the transducer device is of the twin beam type having a pair of essentially parallel extending spaced beam elements similar to that shown in the aforementioned U.S. Pat. No. 4,326,424 but formed entirely by the drilling out of a metal block sensor beam member instead of by the costly machining operations normally employed heretofore to form such sensor beam block members with twin strain beam elements. The spaced pair of strain beam elements are of mirror reflection, like form and are formed in the sensor beam block member by drilling a cluster array of drill holes therein extending in parallel, overlapping, contiguous relation completely through the block member from one side to the other side thereof and located entirely interiorly of the confines of the block member and of symmetrical form and disposition on opposite sides of the center axis of the block member and together forming a total drilled out interior passage therethrough laterally extending closely adjacent the top and bottom surfaces of the block member to form thereat the pair of spaced, like form, strain beam elements.

In accordance with a further aspect of the invention, the self-aligning bearing rotatably supporting the guide roll support shaft on the flexurable end of the strain beam means is provided with barrel-shaped roller elements which afford high load capacity to the transducer device.

In accordance with a still further aspect of the invention, the base or housing within which the transducer device is mounted is provided at its rearward end with an annular groove in its outer wall surface, instead of with the conventional outwardly extending annular mounting flange, to thereby adapt the housing for use as a universal type thereof for mounting the transducer device comprising the invention as well as other types of such devices on various different forms of support frames or mounting members.

The principal object of the invention is to provide a new and improved web tension measuring device which is of comparatively simple form composed of a minimum number of easily and economically fabricated component parts which are easy to assemble and disassemble, which device has a minimum hysteresis loop in its electrical response curve and is accurate and reliable in operation over an extended period of operating time.

Another object of the invention is to provide a web tension measuring device with a novel locking arrangement of a self-aligning bearing of the device onto a trunnion bearing supported on the end of the guide roll support shaft of the device whereby fretting corrosion of the bearing interface surfaces and attendant production of hysteresis is minimized.

Still another object of the invention is to provide a novel form of strain beam construction of the twin beam type for use in a web tension measuring device, which strain beam is easy and inexpensive to fabricate.

A further object of the invention is to provide a web tension measuring device with a particular form of self-aligning bearing rotatably mounted the guide roll support shaft of the device on the flexurable end of the strain beam thereof and affording relatively high load capacity.

A still further object of the invention is to provide a universal type enclosure housing for the strain beam means and self-aligning bearing components of a web tension measuring transducer device which housing is easily adaptable for mounting various forms of such transducer devices on various different types of support frames or mounting members.

Further objects and advantages of the invention will be apparent from the following detailed description of a preferred species thereof and from the accompanying drawings.

BRIEF DESCRIPTION OF THE DRAWINGS

FIG. 3 is a vertical section view taken on the line 3—3 of FIG. 2;

FIG. 4 is a vertical section view taken on the line 4—4 of FIG. 2;

FIG. 5 is a vertical section view taken on the line 5—5 of FIG. 2 and with the coupling member of the device shown partly broken away in section;

DESCRIPTION OF THE PREFERRED EMBODIMENT

Figure 1:
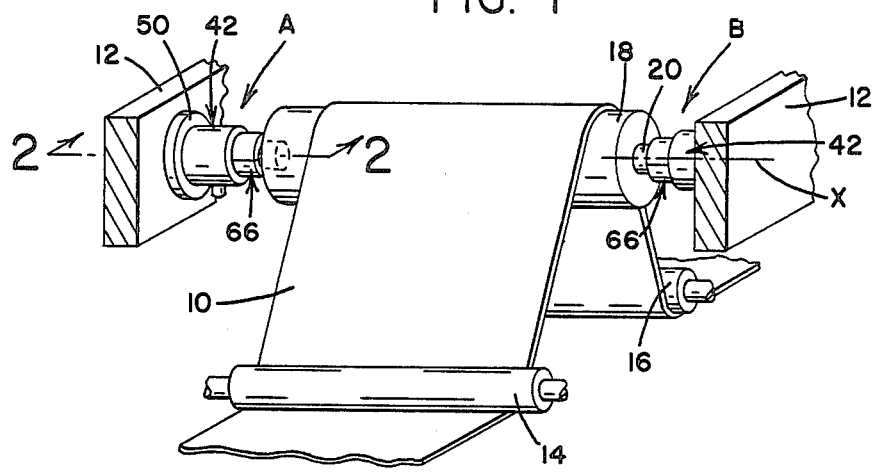
FIG. 1 is a fragmentary perspective view of the general arrangement of a system for monitoring the tension in a moving web.

Referring now to the drawings wherein the showings are for the purposes of illustrating a preferred embodiment of the invention only and not for the purpose of limiting same, FIG. 1 illustrates a web 10 continuously moving lengthwise through a web handling apparatus comprised of a frame 12, a pair of spaced parallel idler rollers 14, 16 extending horizontally, for example, generally in a common horizontal plane, and a web tensioning guide roll or roller 18 extending parallel to and located between but displaced from, e.g., above, the plane of the two idler rollers 14, 16 by an amount such that the web 10, as it moves over the guide roll 18, is displaced from its normal line of movement parallel to the plane of the idler rollers 14, 16 and wraps partly around the guide roll 18. The tension in the web 10 thus exerts a force downwardly against the guide roll 18 which is located somewhere between the two idler rollers 14, 16, the direction of which force depends upon the angle subtended by the web as it passes over the web tensioning guide roll 18. Thus, where the guide roll 18 is located midway between the two idler rollers 14, 16, the force exerted by the tensioned web against the guide roll 18 is then directed vertically downward thereagainst. The web handling apparatus is conventional and is shown schematically with only those parts thereof pertinent to the present invention being shown.

The guide roll 18 is supported at its opposite ends either in fixed relation on a horizontally extending parallel support shaft 20, or it may be rotatably mounted on the support shaft as by means of ball bearings (not shown). Shaft 20 extends transversely between the side frame portions 12 of the apparatus, and the ends of this shaft are supported relative to the side frame portions by means of respective identical force sensing means or transducer devices A, B in a manner in accordance with the present invention.

In the embodiment shown, each of the force sensing means A and B comprises a sensor beam member 30 formed of metal and comprised of base and movable end plate portions 32 and 34, respectively, which are of essentially corresponding and preferably circular contour and are joined together and held in spaced, parallel, coaxial relationship disposed transversely of the shaft 20 by a pair of spaced, parallel arms 36 and 38 forming flat strain beam portions or elements. The arms 36, 38 are of comparatively thin, generally plate-like form and are disposed flatwise of and parallel to, and laterally spaced apart, e.g. vertically spaced, on opposite sides of and preferably equidistant from, the axis X of shaft 20 in the unloaded condition thereof.

The sensor beam member 30 is mounted within the cylindrical hollow interior or open end chamber 40 of a cup-shaped base or housing 42 as by means of threaded mounting bolts 44 which rigidly fasten the base end plate portion 32 of the sensor beam member to the base end wall 46 of the housing. The base or housing 42 in turn is mounted on the frame 12 of the apparatus, with the open end of its chamber 40 facing toward an end of the guide roll support shaft 20, by means of threaded transducer mounting bolts 48 extending through openings in a flange 50 on the housing and screw-threaded into threaded openings in the frame 12. The sensor beam member 30 and attached housing 42 are mounted on the frame 12 by the fastening bolts 48 with the spaced strain beam or bridge portions 36, 38 disposed flatwise in respective horizontal planes which extend parallel to and on opposite sides of the axis X of the guide roll support shaft 20 in the unloaded condition thereof, and which planes are disposed normal to the direction of the forces imposed on the guide roll 18 and its support shaft 20 due to the tension in the moving web 10. Thus, where these web tension forces are to be directed vertically downward against the guide roll 18, the sensor beam member 30 and the housing 42 to which it is fastened are mounted in such case on the frame 12 with the strain beam or bridge portions 36, 38 of the sensor beam disposed flatwise in approximately parallel horizontal planes. The strain beam or bridge portions 36, 38 of the sensor beam member 30 thus are cantilever mounted at their anchor ends on the fixed base end plate portion 32 so that their other ends are free to bend or deflect downwardly when forces are imposed on the movable plate 34 by the downward forces imposed on the guide roll shaft 20 due to the tension in the web 10. As the downward force on the movable plate 34 increases, the upper surfaces of the strain beam portions 36, 38 adjacent the base end plate portion 32 are in a state of increasing tension while the opposite or lower surfaces adjacent the base end plate portion 32 are in a state of increasing compression. Conversely, as the downward force on the movable plate 34 decreases, the upper surfaces of the strain beam portions 36, 38 adjacent the plate portion 32 are in a state of decreasing tension while the lower surfaces adjacent the plate portion 32 are in a state of decreasing compression.

Figure 2:
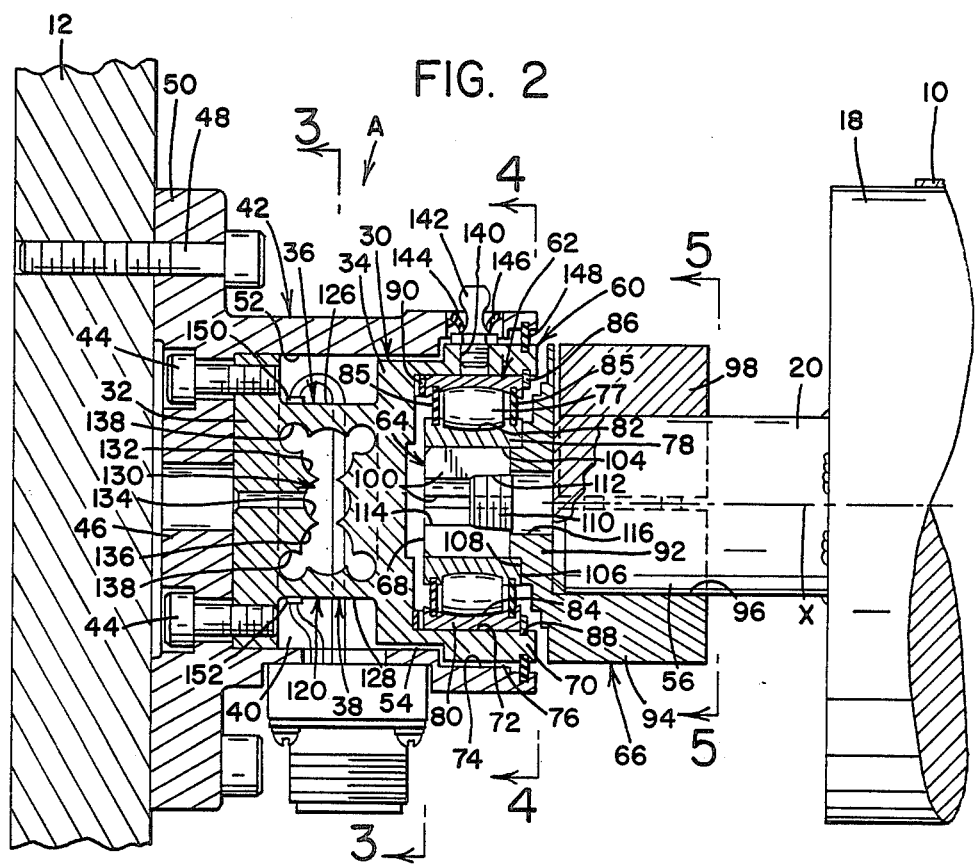
FIG. 2 is an enlarged fragmentary vertical section view of one end of the web tension measuring apparatus comprising the invention taken approximately on the line 2—2 of FIG. 1 and showing in detail a preferred embodiment of a twin beam sensor in its normal state with no web tension forces imposed thereon.
Figure 6:
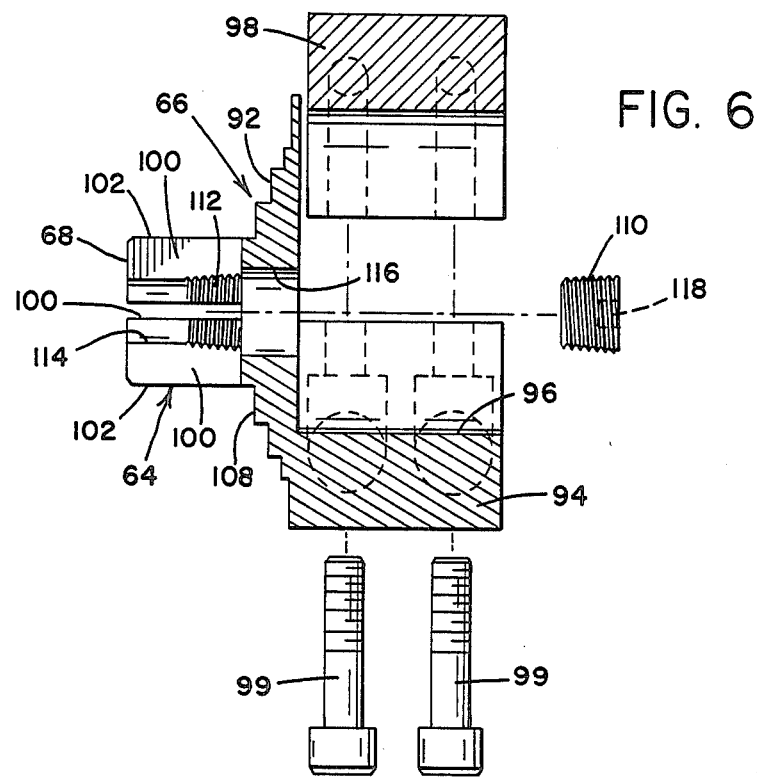
FIG. 6 is an exploded vertical axial section view of the coupling member of the device and showing the threaded pipe plug for expanding and locking the member to the inner race of the self-aligning bearing of the device.
Figure 7:
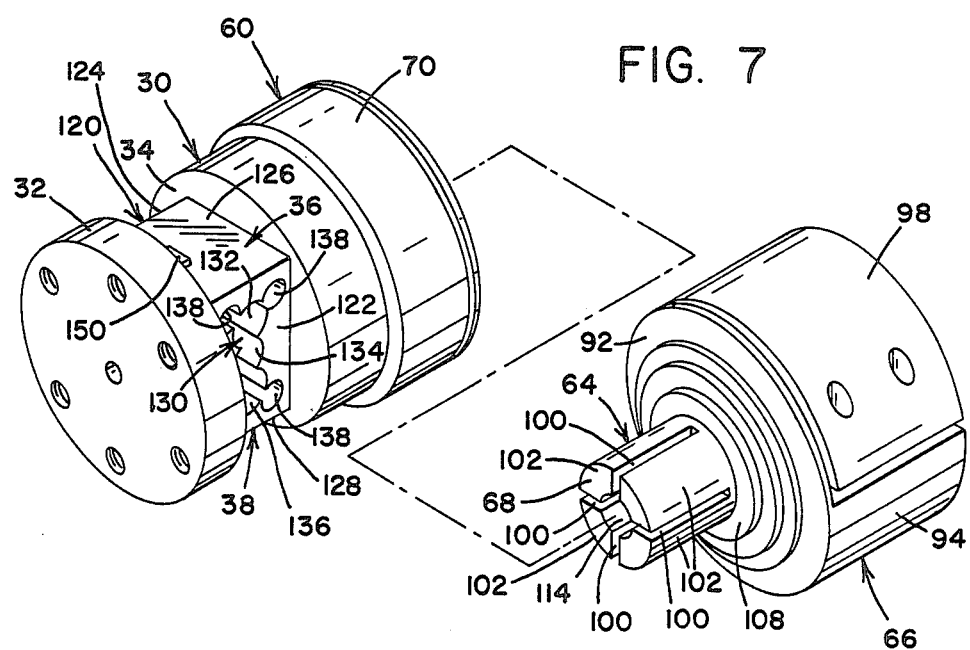
FIG. 7 is an exploded perspective view of the sensor beam member and the assembled coupling member of the device.

As shown particularly in FIG. 2, the movable end plate portion 34 of the sensor member 30 is of somewhat smaller diameter than the diameter of the cylindrical chamber or bore wall 52 of the housing 42 so as to provide a slight clearance therebetween as indicated at 54 for permitting a limited amount of downward deflection movement of the sensor beam members 36, 38 and end plate portion 34 by the web tension forces applied to the guide roll support shaft 20. The wall 52 of the housing chamber or bore 40 thus serves as a positive mechanical stop during the operation of the apparatus for engaging with the periphery of the movable end plate portion 34 of the sensor beam 30 to prevent excessive downward deflection and resulting overloading of the strain beam portions 36, 38 thereof.

The end 56 of shaft 20 is coupled to and supported in place on the movable end of the sensor member 30 by a novel mounting arrangement according to the invention and comprised of a cup-shaped end receptacle 60 formed on the sensor member 30 and a self-aligning bearing 62 fitted within the receptacle 60 and surrounding and fitted on a multilply axially split tubular collar portion 64 formed on, and projecting in a direction axially endwise of the shaft end 56 from a coupling member 66 fixedly secured on the shaft end. The shaft 20 thereby is rotatably supported on the sensor member 30 by the self-aligning bearing 62 which then allows for minor misalignment of the transducer and/or bending of the guide roll shaft 20 by the load imposed thereon.

The cup-shaped end receptacle 60 is comprised in part of the movable end plate portion 34 of the sensor member 30, which plate portion 34 extends transversely of the sensor beam portions 36, 38 in closely spaced opposed relation to the end extremity 68 of the collar portion 64 of coupling member 66, and an annular side wall portion 70 extending from the end plate portion 34 in a direction toward the shaft end 56 to enclose the tubular collar portion 64. The annular side wall portion 70 defines a short open end bore 72 concentric with the axis X of shaft 20, in the normal unloaded condition thereof, and facing toward the shaft end 56. The outer periphery of the annular side wall portion 70 is also spaced a slight distance from the wall of an end counterbore 74 in the bore 52 of housing 42, as indicated at 76 in FIG. 2, to permit a limited amount of downward deflection of the sensor beam portions 36, 38 and the associated end receptacle 60 before the periphery of end plate portion 34 engages with the bore wall 52 of the housing 40.

The self-aligning bearing 62 preferably is, as shown, of the roller bearing type having rolling elements 76 of barrel shaped, i.e., convexly contoured or synclastic roller form rotatable between inner and outer races 78, 80, respectively, with bearing surfaces 82 and 84 of spherically dished shape conforming to the convex contour of the barrel shaped rollers 76. The use of such a roller bearing type self-aligning bearing 62 for journaling the shaft 20 on the sensor beam member 30 of the transducer device affords a high load capacity to the device as compared to that afforded by the conventional ball bearing type self-aligning bearings commonly employed in such devices heretofore and provided with ball shaped bearing elements. The self-aligning bearing 62 is provided with built-in annular grease seals 85 which are located on each side of the bearing roller elements 76 and close off the space between the inner and outer races 78, 80 at each side thereof to form therewith a grease tight chamber containing lubricating grease and within which the roller elements 76 are confined. The grease seals 85 are fitted in annular grooves in the bearing surfaces 82, 84 of the inner and outer races 78, 80 to hold them in place in the bearing 62.

The outer race 80 of bearing 62 has an axially sliding fit in the bore 72 of the cup-shaped end receptacle portion 60 of the sensor member 30, and it is retained in place therein by a retainer ring 86 removably secured within the wall of the bore 72. The retainer ring 86 is preferably in the form of a snap ring which is snap locked into an annular groove 88 (FIG. 4) in the wall of the bore 72 for easy removal therefrom to permit easy disassembly of the bearing 62 from the end receptacle portion 60 of the sensor member 30 should it be necessary for some reason or other to replace the bearing at some time during the service life of the transducer device.

A soft acting spring washer 90 preferably of wave shape type is slidably fitted in the bore 72 of the cup-shaped end receptacle portion 60 of the sensor member 30 and interposed in biased position between the inner or base end wall of the bore 72, against the movable end plate portion 34 of the sensor member 30, and the axial facing side of the outer race 80 of the self-aligning bearing 62, to constantly yielding urge the bearing 62 toward axially abutting engagement with the retainer ring 86. The yieldability of the spring washer 90 permits the bearing 62 to slide in the bore 78 in an axial direction away from the retainer ring 86 to accommodate lengthwise expansion of the guide roll support shaft 20 caused by a temperature rise therein during the operation of the web tension measuring device.

The coupling member 66 comprises a circular disc portion 92 of a diameter generally conforming to the outer diameter of the annular side wall 70 of the cup-shaped end receptacle portion 60 of the sensor member 30 and having the tubular collar portion 64 projecting axially of the disc portion 92 from one side thereof, and a saddle portion 94 projecting from the other side and formed with a semi-cylindrical shaft-receiving recess 96. The coupling member 66 is fixedly secured onto the shaft end 56 by clamping the saddle portion 94 of the coupling member, and a cooperating clamping member such as a saddle block 98, tightly together around the shaft end 56 by clamping screws 99, whereby the disc portion 92 and the collar portion 64 of the coupling member 66 then are both positioned coaxially of the shaft 20.

The inner race 78 of the self-aligning bearing 62 is fitted on, and in accordance with the invention is tightly locked onto the axially projecting tubular collar portion 64 of the coupling member 66 by a novel locking arrangement which among other things affords easy assembly of the coupling member 66 with the bearing 62 and easy disassembly thereof. To this end, the tubular collar portion 64 of the coupling member 66 is provided with a plurality (preferably four as shown) of radial through slots 100 equally spaced apart there around and extending axially inwardly of the collar portion from the end extremity thereof throughout substantially its full axial extent. The radial slots 100 extend completely through the cylindrical wall of the tubular collar portion 64 to thus form the latter as a multiply axially split collar having a plurality (four in the particular case illustrated) of somewhat spring like fingers 102 free to be forcefully expanded radially outward to a limited degree sufficient to tightly engage with the cylindrical inner surface 104 of the inner race 78 of the bearing 62 to thus tightly lock the collar portion 64 to the bearing 62, with the outer side face 106 of the bearing race 78 abutting against an annular shoulder 108 on the disc portion 92 of coupling member 66.

The radially outward expanding of the spring fingers 102 forming the collar portion 64 of the coupling member 66 to thereby lock it to the self-aligning bearing 62 is effected by the forcible insertion of a tapered locking member such as a tapered screw-threaded pipe plug 110 into a tapered screw-threaded socket portion 112 of the axial center passageway 114 through the collar portion 64 and disc portion 92 of the coupling member 66. The tapered socket portion 112 is located within the axial passageway 114 at a position intermediate the opposite ends thereof and entirely within the slotted collar portion 64 of the coupling member 66, with the largest diameter end of the tapered socket portion 112 being located adjacent the juncture of the collar portion 64 and the disc portion 92 of the coupling member and communicating with a somewhat larger diameter entry portion 116 of the axial passageway 114 extending through the coupling member. The tapered pipe plug 110 is inserted through the largest diameter end portion 116 of the axial passageway 114 and screwed into the threaded socket portion 112 thereof to effect the radially outward expanding of the spring fingers 102 comprising the collar portion 64 of the coupling member into tight engagement with the surrounding inner race 78 of the self-aligning bearing 62 and thus firmly lock the coupling member thereto. To enable the rotative threading of the pipe plug 110 into the tapered threaded socket portion 112 of the coupling member 66, the pipe plug is preferably provided with a hex socket 118 in its larger diameter or head end, as shown in FIG. 4, for the reception of an Allen type hexagonal wrench for rotating the pipe plug.

The arrangement as described above for locking the collar portion 64 of the coupling member 66 to the inner race 78 of the self-aligning bearing 62 enables easy coupling and assembly of the guide roll shaft 20 with the sensor member 30 of the transducer device. Thus, with the self-aligning bearing 62 inserted and locked in place in the bore 72 of the end receptacle portion 60 of the sensor member 30 by the retaining ring 86, the tubular collar portion 64 of the coupling member 66 is simply inserted axially into the inner race 78 of the bearing 62 to its fully inserted position therein, and the pipe plug locking member 110 then inserted in and forcibly screw threaded into the tapered threaded socket 112 of the collar portion 64 to lock the coupling member 66 to the self-aligning bearing 62, thereby completing the assembly of the transducer device A or B. The assembled transducer device is then secured to an end 56 of the guide roll support shaft 20 by seating the shaft in the semi-circular shaped shaft receiving recess 96 in the saddle portion 94 of the coupling member 66 and bolting of the saddle block 98 to the saddle portion 94 of the coupling member. The shaft end 56 thus is tightly clamped to the coupling member 66 to rotatively couple the shaft 20 to and support it on the sensor beam member 30 of the transducer A or B. The clamping of the transducer device A or B to the respective end 56 of the support shaft 20 may be performed either before or after the mounting of the respective transducer device on the support frame 12 of the tension measuring apparatus by the fastening bolts 48.

In accordance with a further feature of the invention, the sensor member 30 may be formed with the vertically spaced pair of parallel strain beam portions or elements 36 and 38 in a novel, easily accomplished manner which eliminates the relatively expensive machining operations heretofore conventionally employed for such purpose and eliminates the need for totally removing, from the metal block member from which the strain beam member 30 is fabricated, the entire inner portion of the metal block member lying between the two beam elements 36, 38. Thus, the particular sensor member 30 illustrated in the drawings is formed from a body member of a suitable metallic material such as aluminum, for instance, and having a bridge section 120 of rectangular transverse cross-section bridging a base end plate portion 32 and a movable end plate portion 34 which is provided with the end receptacle portion 60. The bridge section 120 is provided with parallel side faces 122, 124 (FIG. 3), and with parallel upper and lower surfaces 126, 128 which ultimately form, respectively, the top surface of the upper sensor beam element 36 of the finished sensor member 30 and the bottom surface of the lower sensor beam element 38 of such member 30.

The strain beam portions or elements 36, 38 of the illustrated sensor member 30 are formed in the bridge section 120 of the body member from which the sensor member is fabricated, by the formation therein of a cluster array 130 of drill holes of various diameters extending in parallel overlapping contiguous relation entirely through the bridge section 120 from one side face 122 to the other side face 124 thereof in a direction transversely of the center axis of the bridge member and parallel to the top and bottom surfaces 126, 128 thereof, and located interiorly of the confines of the bridge member on opposite sides of, i.e., above and below, the center axis of the bridge member which is coincident with the axis of the annular end receptacle portion 60 and the axis X of the shaft 20. The drill holes in the bridge member 120 located above the center axis are symmetrical to those located therebelow and together form a total drilled out, centrally located, core passage or cluster array 130 of drill holes through the bridge section 120 laterally extending to regions closely adjacent the horizontal top and bottom surfaces 126, 128 of the bridge member 120 to form thereat the pair of spaced, mirror reflective like form strain beam portions or elements 36, 38 of the sensor beam member 30.

The particular cluster array 130 of drill holes shown forming the core passage through the sensor beam member 30 and the resulting strain beam portions 36, 38 thereof includes, as shown in FIG. 2, a centrally located vertical row of comparatively large size diameter drill holes 132, 134, 136 disposed in symmetric relation with and in a plane normal to the coincident sensor beam and shaft axis X, and respective pairs of comparatively small size diameter, like drill holes 138 overlapping respective ones of the end drill holes 132, 136 in the vertical row of large size drill holes, at the laterally outward sides thereof at the respective ends of the row of holes 132, 134, 136. After the coring out of the bridge section 120 by the drilling of the cluster array 130 of drill holes 132, 134, 136, 138 therein, the only portions of the original bridge section 120 that are then left interconnecting and bridging the base end plate portion 32 and the movable end plate portion 34 of the sensor member 30 are the comparatively thin plate like portions which remain at the top and bottom of the bridge section 120 and form the strain beam portions 36, 38 of the sensor member 30. The upper strain beam portion 36 is defined by the flat top surface 126 of the predrilled out bridge section 120 and by a fluted bottom surface constituted of the composite adjoining arcuate portions of the overlapping drill hole 132 and the upper pair of holes 138, while the lower strain beam portion 38 is defined by the flat bottom surface 128 of the predrilled out bridge section 120 and by a fluted upper surface constituted of the composite adjoining arcuate portions of the overlapping drill hole 136 and the bottom pair of holes 138. Because of their exact, albeit inverted, mirror like form in both end-to-end as well as cross-sectional contour, the two strain beam elements 36, 38 as formed in the particular manner described above will operate, in conjunction with conventional strain gauges mounted thereon, to provide the desired continuous accurate measurements of the momentary tension forces in the moving web 10.

The coupling arrangement supporting the end 56 of the guide roll support shaft 20 on the sensor beam member 30 is provided with means for lubricating the bearing surfaces between the self-aligning bearing 62 and the receptacle 60 within which it is seated in order to thereby minimize the friction therebetween and thus the hysteresis in the web tension measurements provided by the apparatus. Lubricating grease is introduced between these bearing surfaces through a threaded opening 140 extending through the annular side wall 70 of the end receptacle 60 and communicating with the interface between the bearing surfaces. A grease fitting 142 is screw threaded into the threaded opening 140 to close it off from the outside after the introduction of lubricating grease between the interfaced bearing surfaces of self-aligning bearing 62 and the receptacle 60. The grease fitting 142 is inserted and secured within the threaded opening through a registering opening 144 in the wall of the housing 42. A ring shaped dust seal 146 is fitted in dust tight engagement within the opening 144 and around the grease fitting 142 therein to prevent the ingress of dust and dirt particles or other foreign matter into the hollow interior or chamber 40 of the transducer housing 42. Another ring shaped dust seal 148 is fitted in dust tight engagement within the end counterbore 74 of the housing 42 and around the annular side wall portion 70 of the end receptacle 60 of the sensor beam member 30 to likewise prevent the ingress of dust and dirt particles or other foreign matter into the hollow interior or chamber 40 of the transducer housing 42.

In the embodiment of the invention shown, the arms or strain beam elements 36, 38 form twin support means for supporting the movable end plate portion 34 of the sensor beam member 30 relative to the base end plate portion 32 thereof, and at the same time form resilient or flexurable beam means allowing the plate portion 34 of the sensor member 30 to move downwardly parallel relative to the base end plate portion 32, and in a direction transversely of the shaft axis X and coincident axis of the coupling collar portion 64, due to forces imposed on the guide roll 18 and associated support shaft 20 by the tensions in the continuously moving web 10. The web 10 imposes a vertical force downwardly in the vertical axial plane of the shaft 20 which force is applied by the shaft end to the plate 34 through the self-aligning bearing 62, and this force then causes the strain beam arms or elements 36, 38 to bend in like, slightly S-shaped manner, as shown in FIG. 3 of the aforementioned U.S. Pat. No. 4,326,424. Because the arms 36, 38 are widely spaced apart relative to their length, the movable end plate portion 34 of the sensor beam member 30, as it moves vertically in a direction transversely to the shaft axis 20, is held by the arms 36, 38 in parallel relationship with the fixed base end plate portion 32. The forces applied to the sensor beam member 30 are such as never to stress the arms 36, 38 beyond their elastic limit so that they always function as a perfect cantilever spring, and the end plate 34 will always move in exact linear relationship to the forces applied thereto.

Referring to FIG. 2, when the strain beam elements or arms 36, 38 of the sensor member 30 of sensing means A or B are subjected to and deflected by the tension forces of the moving web 10 acting through the guide roll support shaft 20, coupling member 66, bearing 62, and the end receptacle portion 60 of the sensor member, the upper left surface of the upper arm 36 and the lower right surface of the lower arm 38 are in a state of bending tension while the upper right surface of the upper arm 36 and the lower left surface of the lower arm 38 conversely are in a state of bending compression. To measure these tension and compressive strains in the arms 36, 38, conventional type strain gauges 150, 152 are respectively mounted on the upper surface 126 of the upper arm 36 and the lower surface 128 of the lower arm 38, at the ends thereof adjacent the fixed base end plate portion 32 of the sensor member 30, these areas of the arms being the points of maximum flexure thereof due to the forces exerted thereon by the moving web 10. Thus, as viewed in FIG. 2, strain gauge 150 is in a state of bending bending tension while strain gauge 152 is in a state of bending compression. The resistance of these gauges always varies in opposite directions. The same condition would exist in the sensing means B at the opposite end of the support shaft 20, where strain gauges 154, 156 (FIG. 11) corresponding to gauges 150, 152, respectively, are similarly mounted on the strain beam arms 36, 38 of the sensing means B.

Figure 11:
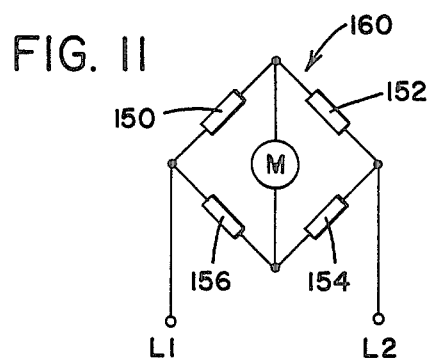

The four strain gauges 150, 152, 154, 156 are connected in a Wheatstone bridge circuit 160, as shown in FIG. 11, in such a manner that as the resistances of strain gauges 150, 154 increase under the bending stress and the resistance of gauges 152, 156 decrease under the bending stress, an indication will be given on meter M connected between two opposite points of the bridge circuit. This bridge circuit 160 is electrically energized at the diagonally opposed other points thereof from a suitable AC or DC power source through wire leads L1 and L2. Electrical amplifying means (not shown) may be substituted for meter M to provide an electrical signal for controlling servo motors or the like for adjusting the web tension.

Instead of employing a sensor member 30 of the twin beam type such as illustrated having a pair of parallel strain beam arms or elements 36, 38 the web tension measuring apparatus according to the invention may be provided, if desired, with a sensor member having only a single strain beam such as shown and described in U.S. Pat. No. 4,674,341 and provided with strain gauges in the manner as therein shown. However, because of the extremely low and practically non-existent hysteresis in the electrical response curve of the web tension measuring device according to the invention provided with the twin beam type strain beam member 30, the device according to the invention therefore is particularly suitable for extremely critical web tension measuring applications.

Figure 8:
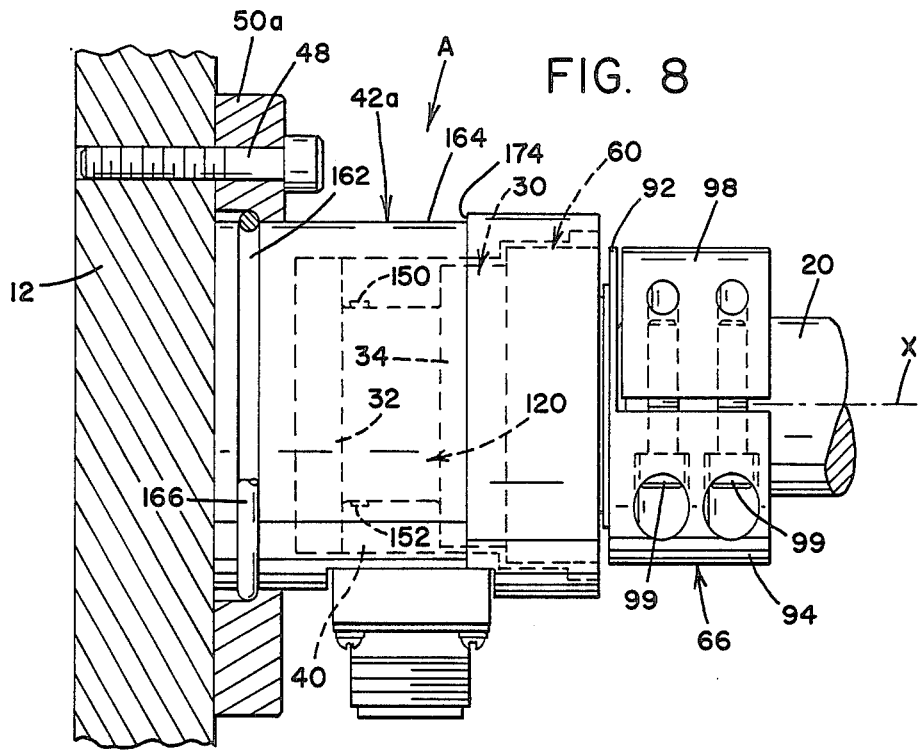
FIG. 8 is a side elevation of a modified form of the device comprising the invention having a universal type housing adaptable for enclosing and mounting the transducer device comprising the invention and other types of such devices on various different forms of support frames or members.
Figure 9:
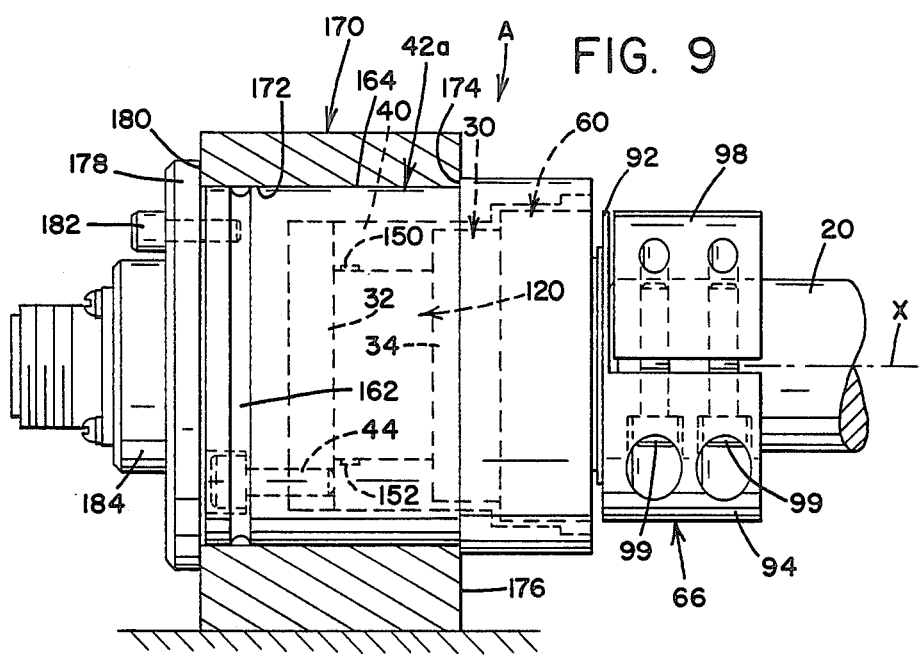
FIGS. 9 and 10 are side elevations showing the manner of mounting the modified device of FIG. 8 on two different forms of support frames or members; and, FIG. 11 is a schematic wiring diagram showing how the strain gauges on the strain beams supporting the opposite ends of the guide roll support shaft of the tension measuring apparatus are electrically connected.
Figure 10:
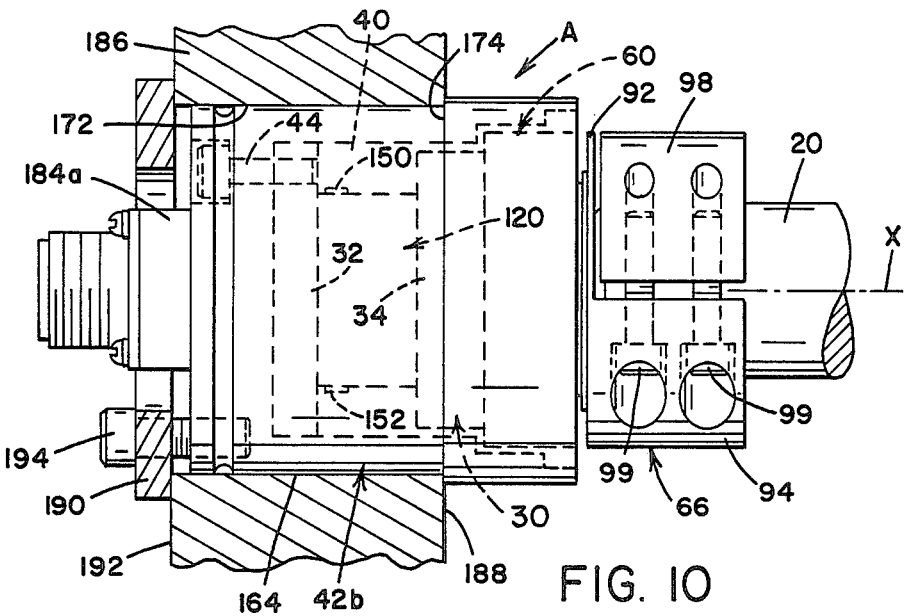

The transducer device according to the invention may be provided with a modified base or housing 42a, as shown in FIGS. 8-10, which differs from housing 42 mainly in that it is provided with a peripheral groove 162 in its cylindrical outer surface 164, adjacent the rearward end of the housing, instead of the mounting flage 50 formed on housing 42. The elimination of the externally protruding mounting flange 50 on the housing 42a thus adapts it for universal use to mount the transducer device A comprising the invention as well as other types of such devices on various different forms of support frames or mounting members. Thus, as shown in FIG. 8, transducer devices such as that according to the invention and provided with the modified type housing 42a, may be mounted on a support frame 12 simply by the insertion and snap-locking of a snap type mounting ring 166 into the peripheral groove 162 in the housing 42a, and then clamping the housing 42a to the support frame 12 by a clamp collar or ring 50a essentially corresponding to the flange 50 on housing 42 and engaged with the snap ring 166 and bolted to the support frame 12 by mounting bolts 48.

Where a transducer device such as, for example, the transducer A having a modified base or housing 42a is to be mounted on a pillow block type support member 170 as shown in FIG. 9 with a bore opening 172 therethrough of a diameter corresponding to that of the cylindrical outer surface 164 of the housing, the portion of the housing provided with the cylindrical outer surface 164 is inserted into the bore 172 of the pillow block support member 170 and axially positioned in clamping position therein with the annular shoulder 174 of the housing, formed thereon by the slightly larger diameter end receptacle portion 60 thereof, abutted against one side face 176 of the pillow block support member 170. The housing 42a of the transducer A is then secured in place in the pillow block support member 170 by a clamp member 178 clamped to the other side face 180 of the support member 170 and bolted to the housing 42a by bolts 182. Clamp member 178 is provided with a central aperture (not shown) and a collar like connector member 184 for passage therethrough of the conductor wires from the strain gauges 150, 152 for connection in the Wheatstone bridge circuit 160.

FIG. 10 illustrates the mounting of a transducer such as the transducer A having a further modified type of housing 42b in a support frame member 186 provided with a bore 172 for receiving the cylindrical portion 164 of the housing 42b which, as shown, is itself provided with the axially endwise, outwardly projecting, collar like connector member 184a for passage therethrough, to the outside of the transducer, of the conductor wires from the strain gauges 150, 152. The modified housing 42b of the transducer A is inserted and axially positioned in clamping position in the bore 172 of the support frame member 186, with the annular shoulder 174 of the housing abutted against one side face 188 of the support frame member 186. The housing 142b is then secured in place in the frame member 186 by the clamp ring 190 through which the connector member 184a projects and which is clamped to the other side face 192 of the frame member 186 and bolted to the housing 42b by bolts 194.

From the above description, it will be evident that a web tension sensing and measuring apparatus or transducer is provided by the present invention which is of simple construction comprised of component parts which are easy and inexpensive to fabricate and do not require critical manufacturing operations and which are easy to assemble and disassemble, as for replacement of a failed self-aligning bearing 62. Thus, to disassemble the force sensing means A or B, all that is required after unbolting of the saddle block 98 from the saddle portion 94 of the coupling member 66 to disconnect the transducer from the end 56 of the guide roll support shaft 20, and unbolting of the housing 42 from the machine frame 12, is to simply unscrew the pipe plug 110 from the threaded socket portion 112 of the coupling member 66 to unlock and disconnect the coupling member from the inner race 78 of the self-aligning bearing 62 so as to permit their axial separation from one another, and then pry the retainer ring 86 out of its retaining groove 88 in the wall of the bore 72 in the end receptacle portion 60 of the sensor beam member 30. The self-aligning bearing 62 is thereby freed for axial removal for the end receptacle portion 60 for easy replacement.

The web tension measuring device according to the invention, moreover, and particularly in view of its preferred twin beam type sensor member 30 and its self lubricating means for the self-aligning bearing 62, is characterized by exceptionally low hysteresis in its electrical response curve such as renders the device eminently suitable for use not only in most ordinary service applications but also for those which require extremely crictical force measurements, and it provides accurate web tension measurements over an extended period of service time. In addition, the tension measuring device as disclosed herein is capable of readily accommodating, without any adverse effect, any normal misalignment of the axis of the guide roll support shaft relative to the common axis of the self-aligning bearing 62 and the end receptacle portion 60 of the sensor beam member 30 such as might occur in the initial assembly and installation of the devise or due to the shaft bending under the forces imparted thereto by the web tension. Also, because the outer race 80 of the bearing 62 is axially slidable to a limited extent within the end receptacle portion 60 of the sensor beam member 30, the device therefore is capable of taking up all normal guide roll shaft length expansion or contraction due to temperature changes therein or otherwise during use.

The invention has been described in connection with a preferred embodiment and certain modifications thereof. Obviously, further modifications and alterations will occur to others upon a reading and understanding of this specification and it is my invention to include all such modifications and alterations insofar as they come within the scope of the appended claims.

Having thus described the invention, it is claimed:

1. A transducer device for connecting one end of a shaft to a support frame, including flexure beam means cantilever supported at one end on said frame and extending in generally longitudinally centered relation with the axis of said shaft toward the said one end thereof, strain gauge means mounted on said beam means for creating a signal indicative of flexure of said beam means, a self-aligning bearing rotatively supporting said one end of said shaft on the flexurable free end of said beam means, a multiply axially split expandable cylindrical collar on one of the said free end of said beam means and the said one end of said shaft and coaxial with said shaft, said self-aligning bearing surrounding and being axially fitted onto said cylindrical collar, and a locking member forcibly inserted into the axial center passageway of said axially split collar and expanding said collar to lock it to the said bearing.

2. A transducer device as defined in claim 1, wherein the said axially split collar is mounted on the said one end of said shaft.

3. A transducer device as defined in claim 1, wherein the said axially split collar is provided in a coupling member secured to the said one end of said shaft.

4. A transducer device as defined in claim 3, wherein the said axial passageway of said axially split collar extends completely through the said collar and said coupling member, and the locking member is inserted into said axial passageway from the end thereof which, in the secured position of the coupling member on the said one end of said shaft, is located adjacent said shaft end.

5. A transducer device as defined in claim 1, wherein the said locking member is a screw threaded tapered pipe plug screwed into the said axial center passageway of said collar.

6. A transducer device as defined in claim 1, wherein the said axial passageway of said axially split collar is provided with a screw threaded tapered socket portion, and the said locking member is an externally screw threaded tapered pipe plug screwed into the said tapered socket portion of said axial passageway to expand and lock the said axially split collar to said bearing.

7. A transducer device as defined in claim 6, wherein the said axially split collar is provided on a coupling member secured to the said one end of said shaft.

8. A transducer device as defined in claim 7, wherein the said threaded socket portion of the said axial passageway of said axial split collar is provided at the end thereof adjacent the said one end of said shaft, and the said pipe plug is inserted and screwed into the said threaded socket portion of said axial passageway from the end thereof which is located adjacent said shaft end.

9. A transducer device as defined in claim 1, wherein the said self-aligning bearing includes an inner race member having an axially extending bore passageway within which the said axially split collar is received and expanded by said locking member to lock the said collar to said inner race member.

10. A transducer device as defined in claim 1 wherein an annular wall is provided on the other one of said one end of said shaft and the said free end of said beam means and surrounding said collar in coaxial spaced relation therewith, and the said self-aligning bearing is interposed between and directly engaged with and supported in place on said collar and in said annular wall to permit relative rotation therebetween about the shaft axis.

11. A transducer device as defined in claim 10, wherein the said axially split collar is mounted on the said one end of said shaft, and the said annular wall is mounted on the said flexurable free end of said beam means.

12. A transducer device as defined in claim 11, wherein the said axially split collar is provided on a coupling member secured to the said one end of said shaft.

13. A transducer device as defined in claim 10, wherein the said axial passageway of said axially split collar is provided with a screw threaded socket portion, and the said locking member is an externally screw threaded tapered pipe plug screwed into the said socket portion of said axial passageway to expand and lock the said axially split collar to said bearing.

14. A transducer device as defined in claim 13, wherein the said axially split collar is provided on a coupling member secured to the said one end of said shaft.

15. A transducer device as defined in claim 13, wherein the said axially split collar is provided with at least four radial slots extending completely radially through the wall of said collar and parallel to the axis thereof and spaced apart equidistantly therearound.

16. A transducer device as defined in claim 10, wherein the said self-aligning bearing includes inner and outer race members, with built-in ring shaped grease seals spanning and closing off the annular space between the said race members, at regions outwardly adjacent each side of the said rolling elements therebetween, and seated in annular grooves in the race members to form therewith a substantially grease tight chamber within which the said rolling elements are concealed.

17. A transducer device as defined in claim 1, wherein the said self-aligning bearing is provided with roller type rolling elements of barrel shaped form with spherically contoured bearing surfaces.

18. A transducer device as defined in claim 1, wherein the said flexure beam means is comprised of a pair of spaced, mirror reflective, like form beam elements constituted by a drilled metal block member centered relative to said shaft axis and formed with a cluster array of drill holes extending in parallel overlapping contiguous relation entirely through the block member from side-to-side thereof in a direction transversely of said shaft axis and located entirely interiorly of the confines of said body member on opposite sides of said shaft axis and partly in closely adjacent relation to the top and bottom surfaces of the block member to form the said pair of beam elements, the drill holes on the opposite sides of said shaft axis being of symmetrical form and arrangement relative to the said shaft axis.

19. A transducing device for connecting one end of a shaft to a support frame and including flexure beam means cantilever supported at one end on said frame and extending longitudinally of said shaft in axially centered relation with the axis thereof, said beam means supporting at its other end the said one end of said shaft for rotation about the shaft axis in a self-aligning bearing interposed between said beam means and said shaft end, and strain gauge means mounted on said beam means for creating a signal indicative of flexure of said beam means, said beam means comprised of a pair of spaced mirror reflective, like form beam elements constituted by a drilled metal block member centered relative to said shaft axis and formed with a cluster array of drill holes extending in parallel overlapping contiguous relation entirely through the block member from side-to-side thereof in a direction transversely of said shaft axis and located entirely interiorly of the confines of said block member on opposite sides of said shaft axis and partly in closely adjacent relation to the top and bottom surfaces of the block member to form the said pair of beam elements, the drill holes on the opposite sides of said shaft axis being of symmetrical form and arrangement relative to the said shaft axis.

20. A transducing device as defined in claim 19, wherein the said drill holes in said block member includes a row of comparatively large size drill holes disposed in symmetrical relation with and in a plane normal to the said shaft axis, and respective pairs of comparatively small size like drill holes overlapping respective ones of the end drill holes in the said row thereof at their laterally outward sides and symmetrically disposed relative to the said shaft axis and to the said plane.

21. A transducer device for supporting one end of a shaft on a support frame means, said device comprising a universal housing having an open end and adapted for mounting at its other end on said support frame means, strain beam means disposed within and cantilever mounted at one end on said housing and extending therein longitudinally of said shaft in axially centered relation with the axis thereof, said beam means supporting at its other end the said one end of said shaft for rotation about the shaft axis by a self-aligning bearing interposed between said beam means and said shaft end, and strain gauge means mounted on said beam means for creating a signal indicative of flexure of said beam means, said housing having a cylindrical outer surface coaxial with the axis of said shaft and a back end wall at the end of said housing opposite the said open end thereof and provided with an opening therethrough communicating with the interior of said housing, and the said cylindrical outer surface of said housing having an annular groove therearound for receiving a snap ring to act as an abutment shoulder on said housing for a mounting flange fitted over the said cylindrical outer surface of said housing for securing it to the said support frame means.

* * * * *